(12) United States Patent
Zimmer et al.

(10) Patent No.: US 7,552,419 B2
(45) Date of Patent: Jun. 23, 2009

(54) SHARING TRUSTED HARDWARE ACROSS MULTIPLE OPERATIONAL ENVIRONMENTS

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 312 days.

(21) Appl. No.: 10/804,489

(22) Filed: Mar. 18, 2004

(65) Prior Publication Data

US 2005/0210467 A1    Sep. 22, 2005

(51) Int. Cl.
  *G06F 9/44*   (2006.01)
(52) U.S. Cl. .................................... 717/121; 717/127
(58) Field of Classification Search ......... 717/120–121, 717/127, 174–178
  See application file for complete search history.

(56) References Cited

U.S. PATENT DOCUMENTS 6,269,409 B1 *   7/2001  Solomon ................... 719/329

2005/0076324 A1 *   4/2005  Lowell et al. ............... 717/100

OTHER PUBLICATIONS

Garfinkel et al., "Terra: A Virtual Machine-Based Platform for Trusted Computing", ACM, pp. 193-205, Oct. 2003.*
Robin et al., "Analysis of the Intel Pentium's Ability to Support a Secure Virtual Machine Monitor", Proceedings of the 9th Usenix Security Symposium, Denver, CO, pp. 129-144, Aug. 2000.*

* cited by examiner

*Primary Examiner*—Ted T Vo
(74) *Attorney, Agent, or Firm*—Blakely, Sokoloff, Taylor & Zafman LLP (57) ABSTRACT

A method, system, and article of manufacture to share trusted hardware across multiple operational environments. A virtual machine monitor (VMM) is loaded to support a plurality of virtual machines in a computer system, the VMM including a VMM multiplexer. A first and a second virtual machine (VM) are loaded. A trusted hardware device is shared between the first VM and the second VM using the VMM multiplexer. In one embodiment, the trusted hardware device includes a trusted platform module (TPM).

21 Claims, 10 Drawing Sheets

| TPM Request Queue 602 |||
| --- | --- | --- |
| Request 604 | VM Id 606 | Interrupt 608 |
| Request 1 | VM[2] | N |
| Request 2 | VM[0] | Y |
| Request 3 | VM[1] | Y |
| ⋮ | ⋮ | ⋮ |

SHARING TRUSTED HARDWARE ACROSS MULTIPLE OPERATIONAL ENVIRONMENTS

BACKGROUND

1. Field of Invention

The field of invention relates generally to computer systems and, more specifically but not exclusively, relates to sharing trusted hardware across multiple operational environments.

2. Background Information

In today's modern society, privacy issues have become a major concern. Modern technologies such as computers and the Internet enable people to access more information at rates never before possible. However, many of the tasks for which people use the Internet are considered highly private or confidential matters. For example, the Internet has streamlined tasks such as banking, filing tax returns, conferencing with business associates, and communicating with friends and family.

Coupled with the advantages that accrue from the Internet is an increased susceptibility to malicious eavesdropping and/or cyber-attack. Thus, as the tools with which people conduct their daily affairs advance in complexity, so too must the means by which private or confidential matters are safeguarded. As such, industry leaders have organized a Trusted Computing Group (TCG) to address these concerns.

TCG is an industry standards body, including computer manufacturers, device manufacturers, and software vendors, who are promoting the security of computing platforms and devices (see, https://www.trustedcomputinggroup.org). One goal of TCG is to promote a security hardware device called the trusted platform module (TPM). The TPM is described in specifications published by the TCG, such as the *TPM Main Specification*, Parts 1-3, Version 1.2, Oct. 2, 2003. The TPM is an isolated device built into the motherboard of a computer system for establishing trust and trust metrics in a Trusted Computing Environment.

Software vendors, such as Microsoft, have begun developing software platforms that will take advantage of the security features provided by a TPM device. Future versions of Microsoft Windows® are expected to provide numerous security functions, including encryption, privacy safeguards, and digital rights management with use of the TPM. However, today's Virtual Machine Monitors (VMMs) do not provide an abstraction to the physical TPM hardware of a platform to allow multiple Virtual Machines (VMs) to share a single physical TPM.

BRIEF SUMMARY OF THE INVENTION

Not applicable.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a method and system to share trusted hardware across multiple operational environments are described herein. In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
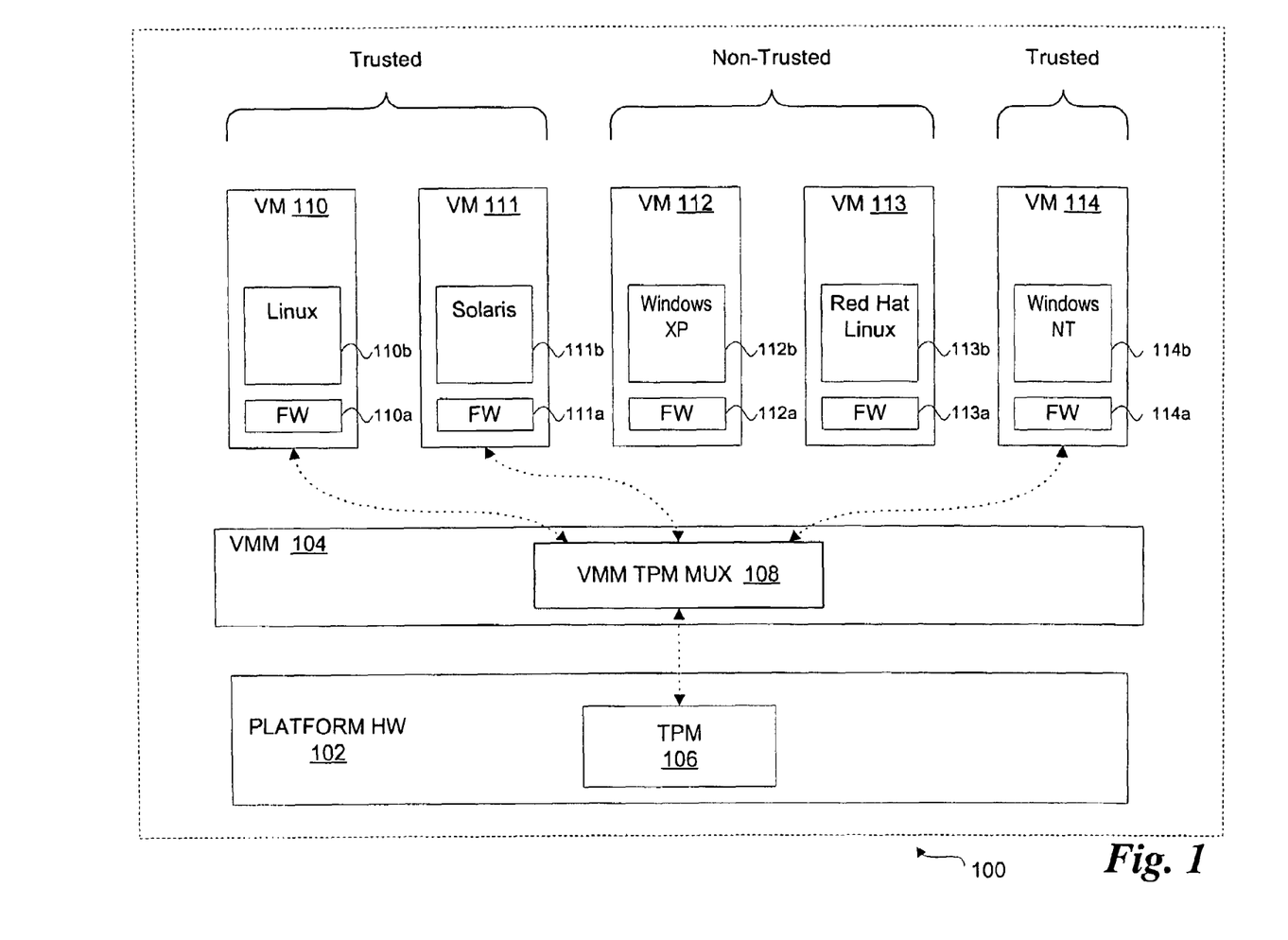
FIG. 1 is a block diagram illustrating one embodiment of a computer system to share trusted hardware across multiple operational environments in accordance with the teachings of the present invention.

FIG. 1 is a block diagram of a computer system 100 to share trusted hardware across multiple operational environments in accordance with one embodiment of the present invention. Computer system 100 includes platform hardware 102. Platform hardware 102 includes a trusted hardware device. In the embodiment shown in FIG. 1, the trusted hardware device is TPM 106. Operating in computer system 100 is a VMM 104 and VMs 110-114. In the embodiment of FIG. 1, VMM 104 is layered on top of platform hardware 102. Each VM includes firmware 110a-114a, respectively, and an operating system (OS), 110*b*-114*b*, respectively. In one embodiment, computer system 100 is a client computer that may be communicatively coupled to a server.

Each of VM 110-114 behaves like a complete physical machine that can run its own OS. Usually, each VM session is given the illusion by VMM 104 that it is the only physical machine. VMM 104 takes control whenever one of the VMs 110-114 attempts to perform an operation that may affect the operations of other VMs to ensure the whole computer system 100 is not disrupted. Each of the VMs 110-114 supports a corresponding OS and firmware. Each OS can be different, as shown in FIG. 1, or a separate instance of the same OS. Since VM sessions 110-114 are separate entities and usually isolated from each other by VMM 104, if one of OS's 110-114 crashes or otherwise becomes unstable, the other OS's 110-114 should not be adversely affected.

In one embodiment, VMM 104 is a firmware driver executing within a firmware environment known as the Extensible Firmware Interface (EFI) (*Extensible Firmware Interface Specification*, Version 1.10, Dec. 1, 2002, available at http://developer.intel.com/technology/efi.) EFI is a public industry specification that describes an interface between platform firmware and shrink-wrap operating systems or other application environments. The EFI specification includes provisions for extending BIOS functionality beyond that provided by the BIOS code stored in a platform's BIOS device (e.g., a non-volatile storage device.) More particularly, EFI enables firmware, in the form of firmware modules and drivers, to be loaded from a variety of different resources, including primary and secondary flash devices, option ROMs (Read-Only Memory), various persistent storage devices (e.g., hard disks, CD-ROM (Compact Disk-Read Only Memory), etc.), and from one or more computer systems over a computer network.

As illustrated in FIG. 1, VMs 110, 111 and 114 are trusted VMs, while VM 112 and 113 are non-trusted VMs. In general, a trusted VM is allowed access to TPM 106. In one embodiment, the characterization of VMs as trusted is a policy decision set by a user or administrator of computer system 100.

Trusted VMs 110, 111, and 114 and their respective OS's may make TPM requests to the TPM asking the TPM to perform a particular action. In one embodiment, these requests may take the form of TPM commands as described in the *TPM Main Specification*, Part 3, version 1.2. A VMM TPM multiplexer 108 (denoted as "VMM TPM MUX") allows TPM requests from VMs 110, 111 and 114 to be multiplexed to a single physical TPM 106.

Figure 2:
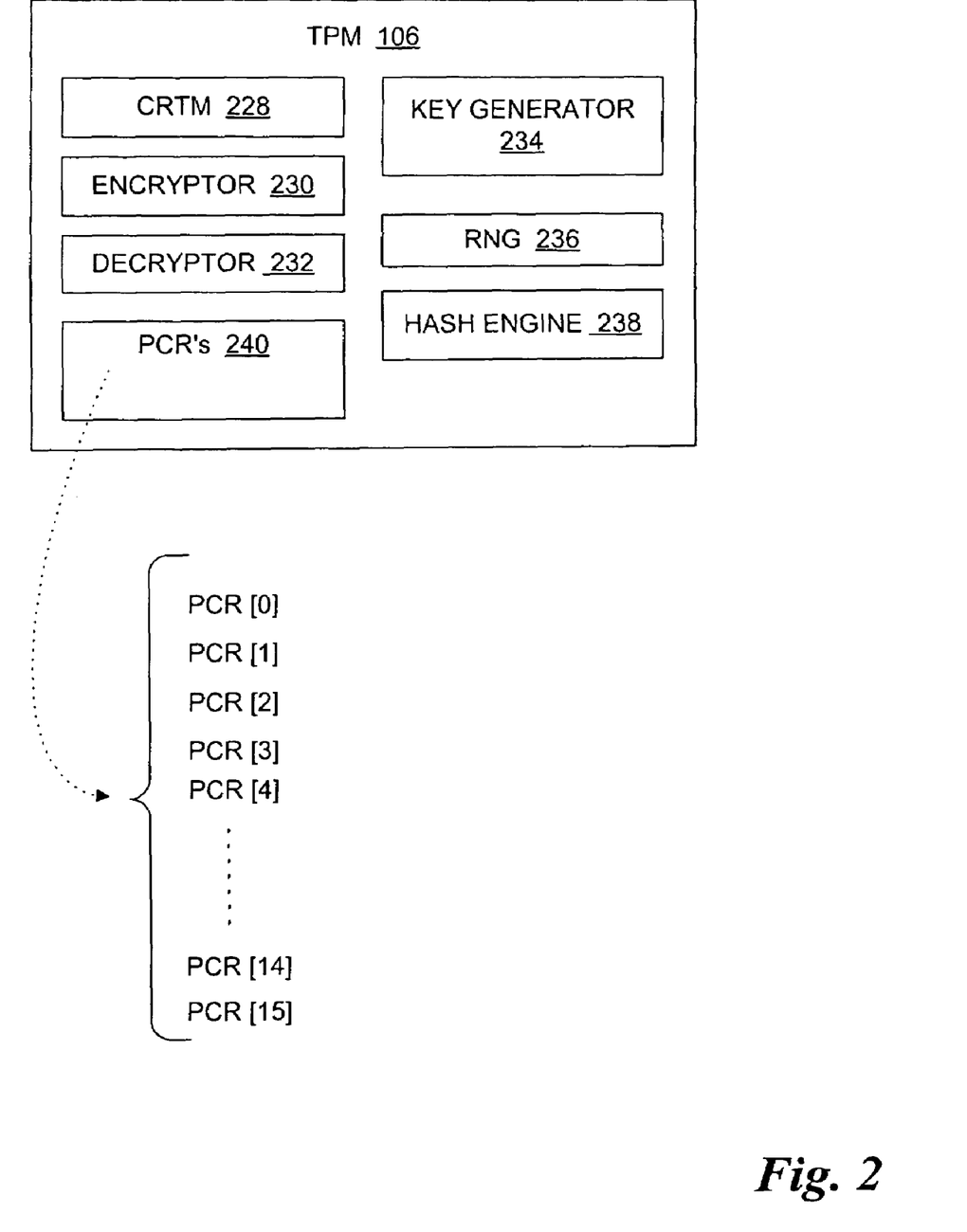
FIG. 2 is a block diagram illustrating one embodiment a trusted hardware device in accordance with the teachings of the present invention.

FIG. 2 is a block diagram illustrating one embodiment a Trusted Platform Module (TPM) 106. TPM 106 includes cryptographic functions that may be executed on board the TPM hardware. In one embodiment, the TPM is integrated into computer system 100 using a Low Pin Count (LPC) bus interface of the chipset.

TPM 106 includes a Core Root of Trust Measurement (CRTM) 228, an encryptor 230, a decryptor 232, a key generator 234, a random number generator (RNG) 236, a hash engine 238, and Platform Configuration Registers (PCRs) 240.

In one embodiment, TPM 106 provides various security functions. The TPM may perform asymmetric key functions for on-chip key pair generation using RNG 236. Hash values representing platform configuration information may be securely stored in the PCRs 240. The hash values enable verification of the platform configuration. In one embodiment, as shown in FIG. 2, TPM 106 includes 16 PCRs (PCR [0] to PCR [15]). One embodiment of managing PCRs across multiple VMs will be discussed below in conjunction with FIGS. 4A-4D.

A hashing function is an algorithm that turns a variable-sized data block into a fixed-sized hash value (a.k.a. a cryptographic checksum). Hashing functions are used to encrypt information. The hash engine 248 may support the secure hash algorithm-1 (SHA-1). TPM 106 may also include a hardware engine to perform Rivest-Shamir-Adleman (RSA) encryption and decryption.

The TPM may also provide an Endorsement Key (EK) that is a public/private key-pair. The private part of the key-pair is maintained within the TPM and not exposed outside of the TPM. The EK is unique to the particular TPM.

Figure 3:
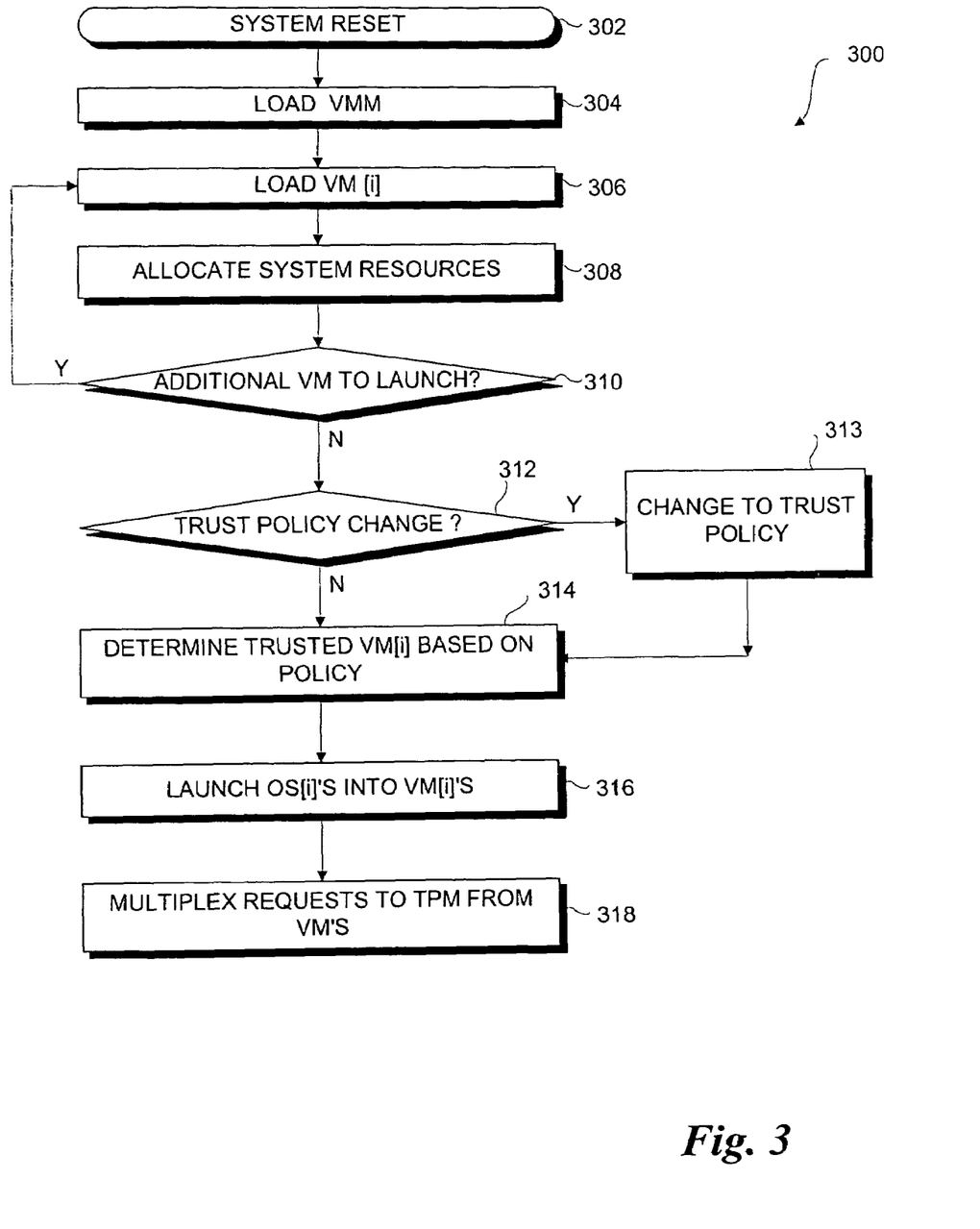
FIG. 3 is a flowchart illustrating one embodiment of the logic and operations to share trusted hardware across multiple operational environments in accordance with the teachings of the present invention.

FIG. 3 shows a flowchart 300 illustrating one embodiment of the logic and operations to share trusted hardware across multiple operational environments. Starting in a block 302, the computer system is reset and initialized. Proceeding to a block 304, VMM 104 is loaded into system memory of platform hardware 102. In one embodiment, VMM 104 is loaded from a non-volatile storage device, such as flash memory; however, VMM 104 may be stored on any storage device communicatively coupled to platform hardware 102, including a network storage device.

In a block 306, a first VM, shown as VM[i] in FIG. 3, is loaded into system memory. In block 308, system resources are allocated for the VM session. The allocated system resources may include a memory buffer, Input/Output bandwidth, processor bandwidth, or the like. Proceeding to a decision block 310, the computer system determines if there are any additional VMs to launch. If the answer is yes, then the logic proceeds to block 306. If the answer is no, then the logic proceeds to a decision block 312.

It will be understood that embodiments of the present invention are directed to more than one VM sharing a physical TPM. In an alternative embodiment, a System Management Interrupt (SMI) Transfer Monitor (STM) may be loaded to support a System Management Mode (SMM) of a VM. In this instance, the STM acts as a virtual monitor similar to VMM 104, but supports execution of a management mode of operation for platform hardware 102, such as SMM. The trusted hardware may be shared by one or more SMMs and one or more VMs.

After all of the VMs have been launched, the logic continues to a decision block 312 to determine if the user wants a change to the trust policy. If the answer is yes, then the logic proceeds to a block 313 to change the trust policy. After the policy is changed, the logic proceeds to a block 314. If the answer to decision block 312 is no, then the logic proceeds to block 314 to determine which VMs are trusted based on the trust policy.

Continuing to a block 316, the OS[i]s are launched into their respective VM[i]s. Once the VMs and OS's are stabilized, the logic proceeds to a block 318 to multiplex requests to the TPM from the VMs.

VMM TPM Multiplexer 108 is a thin layer of software between the VMs and the TPM. In this way, the trusted logic remains with TPM 106. Also, in one embodiment, this allows the VMM to remain untrusted. Any security specific behavior demanded of the VMM is minimized.

Referring to FIGS. 4A, 4B, 4C and 4D, a method to multiplex requests to TPM 106 according to one embodiment of the present invention is shown. It will be understood that while the multiplexing of TPM requests from multiple VMs to a single TPM is described below using the Seal and Unseal commands, embodiments of the present invention are not limited to these particular TPM requests.

The TPM may be used to store secret information as a "blob" (Binary Large Object.) The TPM is used to create a blob and is used to return the content of a blob. Blobs may be used to store secret data or keys, such as symmetric encryption keys and signature keys. Secret data may include sensitive information such as credit card numbers, social security numbers, passwords, or the like.

In one example, the TPM may be used to store secret information by tying a blob to a configuration of a platform. This may be done through TPM Seal and Unseal commands. Sealing provides assurances that protected secrets are only recoverable when the platform is functioning in a specific known configuration. Information bound to a particular platform is only accessible by that platform if the conditions specified in the binding are met.

For the Unseal operation to succeed, proof of the platform configuration that was in effect when the Seal operation was performed must be provided to the TPM. If the blob is moved to another platform or the binding conditions of the blob are not met, access to the secret information in the blob is denied.

The Seal and Unseal operations may be used with the PCRs of TPM 106. Standardized assignments of PCRs to particular configuration information are disclosed in the *TPM Main Specification*, (Parts 1-3), Version 1.2, Oct. 2, 2003. Table 1 below describes the PCR assignments for PCRs 0-7. One embodiment of multiplexing multiple PCRs associated with multiple VMs to a PCR of a single physical TPM will be described below in conjunction with FIGS. 4A-4D. The PCRs associated with a particular VM are managed to prevent cross-contamination of PCRs between multiple VMs.

TABLE 1

| PCR Index | PCR Usage |
| --- | --- |
| PCR [0] | CRTM, BIOS and Platform Extensions |
| PCR [1] | Platform Configuration |
| PCR [2] | Option ROM Code |
| PCR [3] | Option ROM Configuration and Data |
| PCR [4] | Initial Program Loader (IPL) (usually the Master Boot Record (MBR)) |
| PCR [5] | IPL code Configuration and Data (for use by the IPL code) |
| PCR [6] | State transition and wake events |
| PCR [7] | Reserved for future use |

The PCR Usage column of Table 1 describes the type of configuration information that may be hashed into a hash value and then the hash value is stored in a corresponding PCR of the TPM. For example, information about the configuration of the Motherboard including hardware components and how they are configured may be measured to PCR [1]. In another example, code from an option ROM may be measured to PCR[2].

Figure 4A:
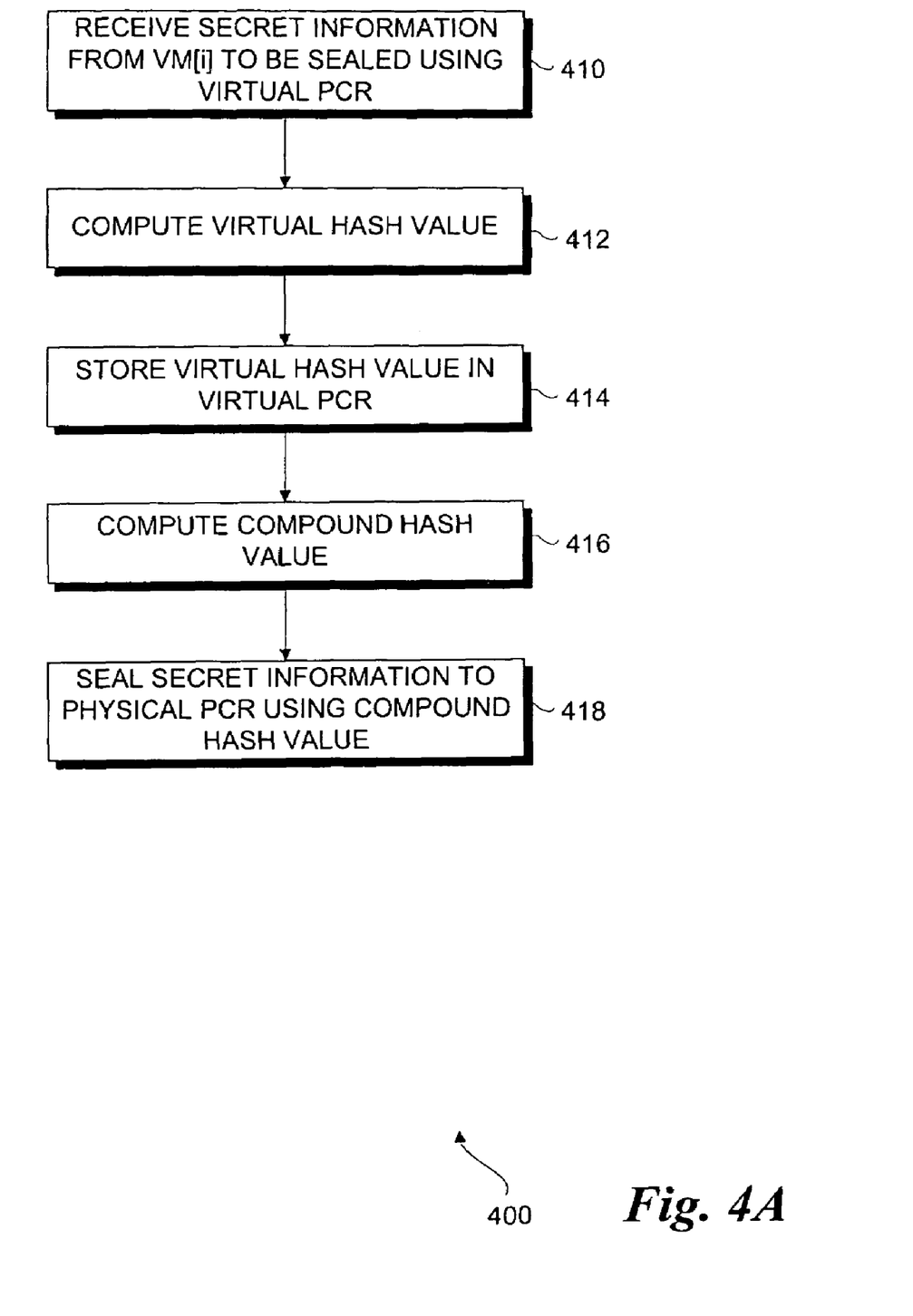
FIG. 4A is a flowchart illustrating one embodiment of the logic and operations to share trusted hardware across multiple operational environments in accordance with the teachings of the present invention.

FIG. 4A shows a flowchart 400 illustrating an embodiment of the logic and operations to multiplex a Seal command across multiple VMs. Starting in a block 410, secret information is received from VM[i] to be sealed via a virtual PCR.

Figure 4B:
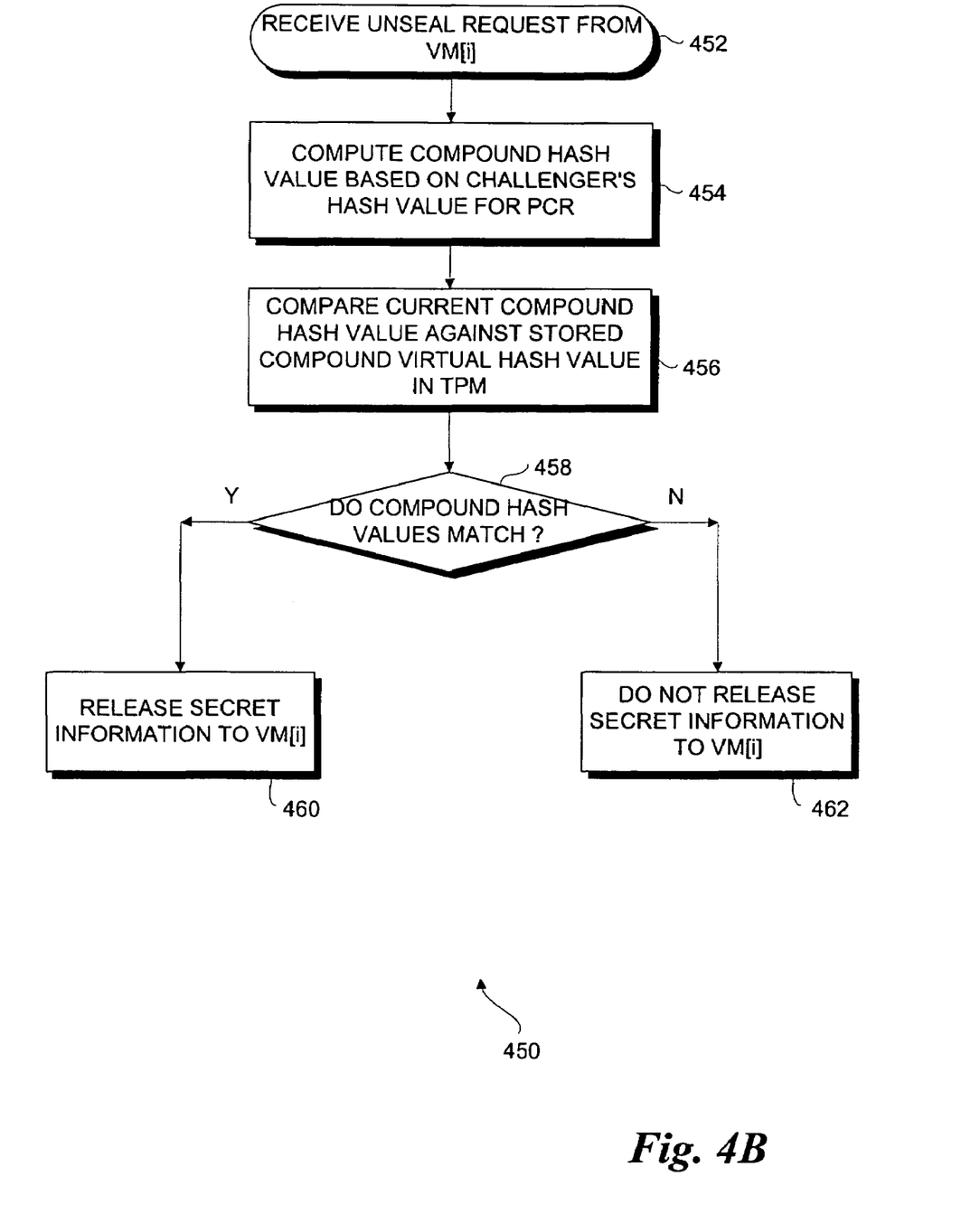
FIG. 4B is a flowchart illustrating one embodiment of the logic and operations to share trusted hardware across multiple operational environments in accordance with the teachings of the present invention.
Figure 4C:
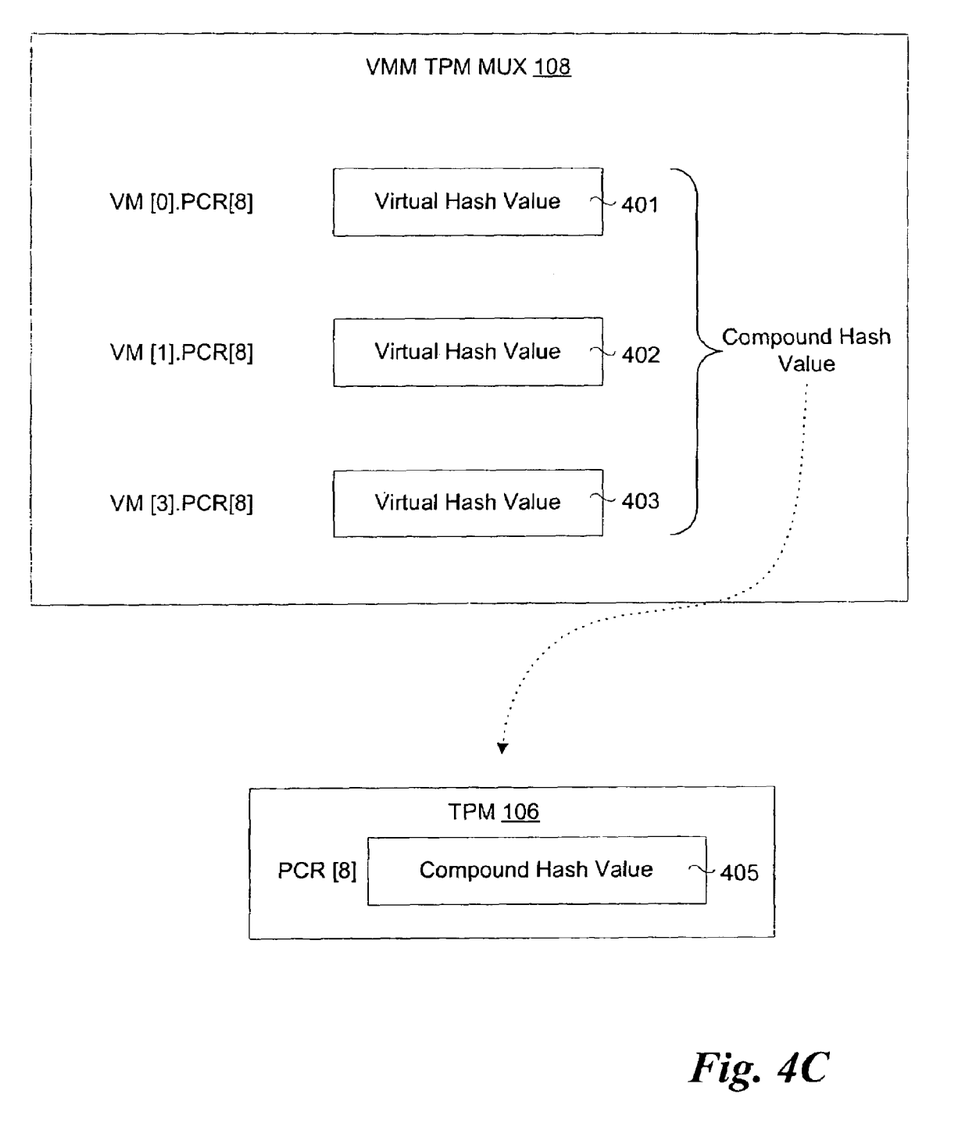
FIG. 4C is a block diagram illustrating one embodiment of sharing trusted hardware across multiple operational environments in accordance with the teachings of the present invention.

FIG. 4C is a block diagram illustrating one embodiment of virtual PCRs to support sharing trusted hardware across multiple operational environments. VMM TPM Multiplexer 108 maintains virtual hash values corresponding to a compound hash value stored in a PCR of the physical TPM 106. Because each VM believes it is the only physical machine working with a single physical TPM, the VMM 104 needs to provide a virtual hash value for each VM. Each VM will believe it is working directly with a PCR of TPM 106. These virtual hash values must be managed to prevent cross-contamination of virtual hash values of the VMs.

FIG. 4C illustrates the coordination of PCR hash values for three trusted VMs (VM[0], VM[1] and VM[3]). The VMM TPM Multiplexer 108 maintains a virtual hash value for PCR [8] of each trusted VM, shown at 401-403. In the embodiment shown in FIG. 4, the sharing of PCR[8] is illustrated as an example, however, it will be understood the other PCRs may be shared in accordance with embodiments of the present invention.

Continuing to a block 412 of flowchart 400, a virtual hash value for the VM[i] is computed. In one embodiment, the Multiplexer 108 executes the hash function to compute the virtual hash value. The input into the hash algorithm is based on configuration metrics of the VM such as those described above in conjunction with Table 1. Other examples of inputs into the hash algorithm include, but are not limited to, a portion of the OS kernel code, the code of various device drivers executing in the VM, or the like.

In a block 414, the virtual hash value is stored in a virtual PCR. The virtual hash values 401-403 may be stored in any storage device accessible by the computer system 100. In one embodiment, the virtual hash values 401-403 are stored in a flash memory device.

It will be understood that the virtual hash values 401-403 do not have to be maintained in a secure location in order to preserve the security of the compound hash value 405. Even if a hacker were to gain access to a single VM, the hacker could not discover the composite hash value. In one embodiment, the virtual hash values 401-403 are stored in a protected page of memory.

Continuing to a block 416, a compound hash value is computed based on the virtual hash values. In FIG. 4C, the Multiplexer 108 provides the virtual hash values 401-403 to the TPM. The TPM 106 generates compound hash value 405 from the virtual hash values 401-403. This compound hash value is stored in PCR[8] of the physical TPM 106.

Updates to a PCR may be referred to as "extending" the PCR, while the data measured to the PCR may be called the "extend." Updates to the PCR are described by the following pseudo code:

$PCR_i$ New=HASH($PCR_i$ Old value||value to add).

In the embodiment of FIG. 4C, virtual hash value 401 is computed and stored as compound hash value 405. When virtual hash value 402 is computed, this value is hash extended into compound hash value 405. And when hash value 403 is computed, it is hash extended into compound hash value 405.

It will be understood that to re-compute the compound hash value 405 all of the virtual hash values 401-403 must remain intact. Thus, if one of the virtual hash values 401-403 is corrupted, then the compound hash value 405 may not be able to be properly re-computed. Since the compound hash value 405 is used by the TPM for security operations, the net result would be that all trusted VMs would lose security capabilities with the TPM.

It will be understood that each particular VM will believe that the virtual hash value for a particular PCR is the "true" hash value. The virtual hash value will be used by the VM when interacting with systems outside of the computer system 100. Also, these outsider systems will believe that the virtual hash value is the "true" hash value of the TPM 106. However, security operations of the physical TPM 106 will be conducted using the compound hash value. The hash is considered a one-way computation in order to prevent a hacker from determining the inputted configuration information using the hash value.

Figure 4D:
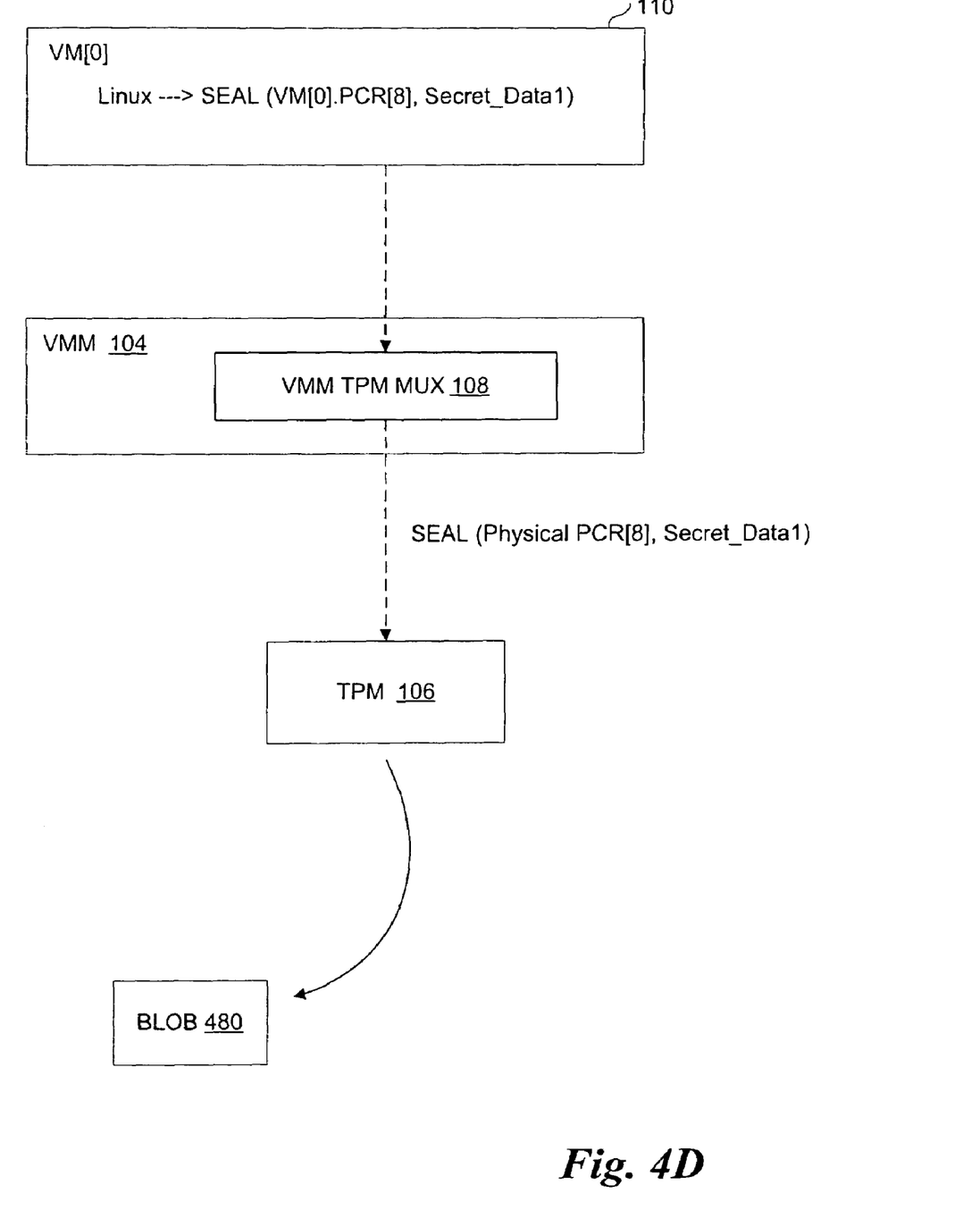
FIG. 4D is a block diagram illustrating one embodiment of sharing trusted hardware across multiple operational environments in accordance with the teachings of the present invention.

Continuing in flowchart 400, the secret information is sealed using the compound hash value, as depicted in a block 418. The Seal operation generates a blob. Referring to FIG. 4D, VM 110 (identified as VM[0]) is executing the Linux operating system. The OS sends a Seal command to the TPM 106 to Seal Secret$_{13}$Data 1 with PCR[8]. VM 110 believes it has exclusive access to TPM 106 and is unaware of the multiplexing by the Multiplexer 108. In one embodiment, the Seal (and Unseal) functions are provide by the Microsoft Cryptographic Application Program Interface (CAPI). Applications and operating systems may use the functions of CAPI without knowing anything about the underlying hardware support.

The Seal command is sent to VMM 104 where it is handled by the VMM TPM Multiplexer 108. The Multiplexer 108 computes the compound hash value 405 and uses this value in the Seal command sent to TPM 106. In response to the Seal command, TPM 106 generates blob 480. Blob 480 may be stored at a storage device accessible to computer system 100, such as, but not limited to, a hard disk, flash memory, or the like. The secret information sealed in the blob cannot be retrieved unless the TPM receives the correct PCR hash value corresponding to the VM platform configuration when the blob was originally sealed.

FIG. 4B shows a flowchart 450 illustrating an embodiment of the logic and operations to multiplex an Unseal command across multiple VMs. Starting in a block 452, an Unseal request is received by VM[i]. In one embodiment, a challenger, usually an outside computer system communicatively coupled to computer system 100, wants access to secret information sealed in a blob from VM[i]. The TPM 106 will not Unseal the secret information to VM[i] unless VM[i] is in the same configuration it was when the secret information was sealed. It will be understood that other security measures may be taken before unsealed information is made available to the challenger.

Proceeding to a block 454, a compound hash value is computed based on the challenger's hash value for the PCR. The compound hash value is computed by TPM 106 using the virtual hash values maintained by the VMM for that PCR and the PCR hash value provided by the challenger. The hash value provided by the challenger will be substituted for the stored virtual hash value for that PCR.

In a block 456, the compound hash value computed is compared against the compound hash valued stored in TPM 106 by TPM 106. Proceeding to a decision block 458, the logic determines if the two compound hash values match. If the answer to decision block 458 is yes, then the secret information is released to VM[i], as depicted in a block 460. If the answer to decision block 458 is no, then the secret information is not released to VM[i], as depicted in a block 462.

Examples of other requests that may be multiplexed to the TPM include use of the TPM's non-volatile memory and random number generator. The TPM may include non-volatile memory for use by the VMs. The VMM may provide an expanded virtual variant of the TPM non-volatile memory through flash memory or sealed information on disk. In the instance of the RNG, requests for random numbers from the TPM may be multiplexed to the various VMs.

Figure 5:
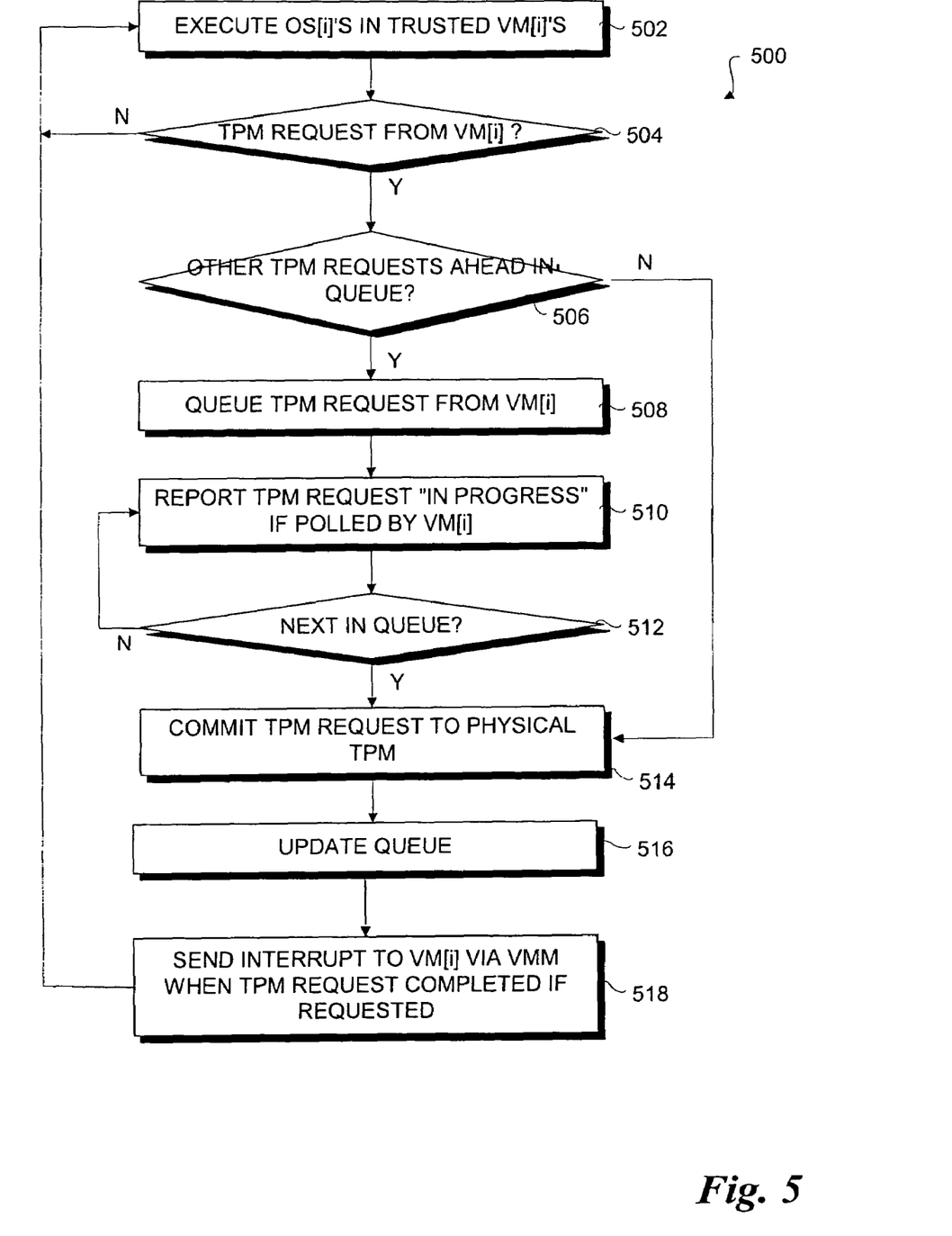
FIG. 5 is a flowchart illustrating one embodiment of the logic and operations to queue trusted hardware requests to share trusted hardware across multiple operational environments in accordance with the teachings of the present invention.

FIG. 5 shows a flowchart 500 of one embodiment to queue trusted hardware requests to share trusted hardware across multiple operational environments. In the embodiment of FIG. 5, since each VM believes it has exclusive rights to TPM 106, the VMM 104 must have a way to handle multiple TPM requests sent from different VMs. Beginning in a block 502, OS[i]s are executing in trusted VM[i]s, respectively. In a decision block 504, the logic determines if a TPM request has been received from VM[i]. If the answer is no, then the logic returns to block 502. The logic proceeds to decision block 506 to determine if other TPM requests are ahead of the TPM request in the queue.

Figure 6:
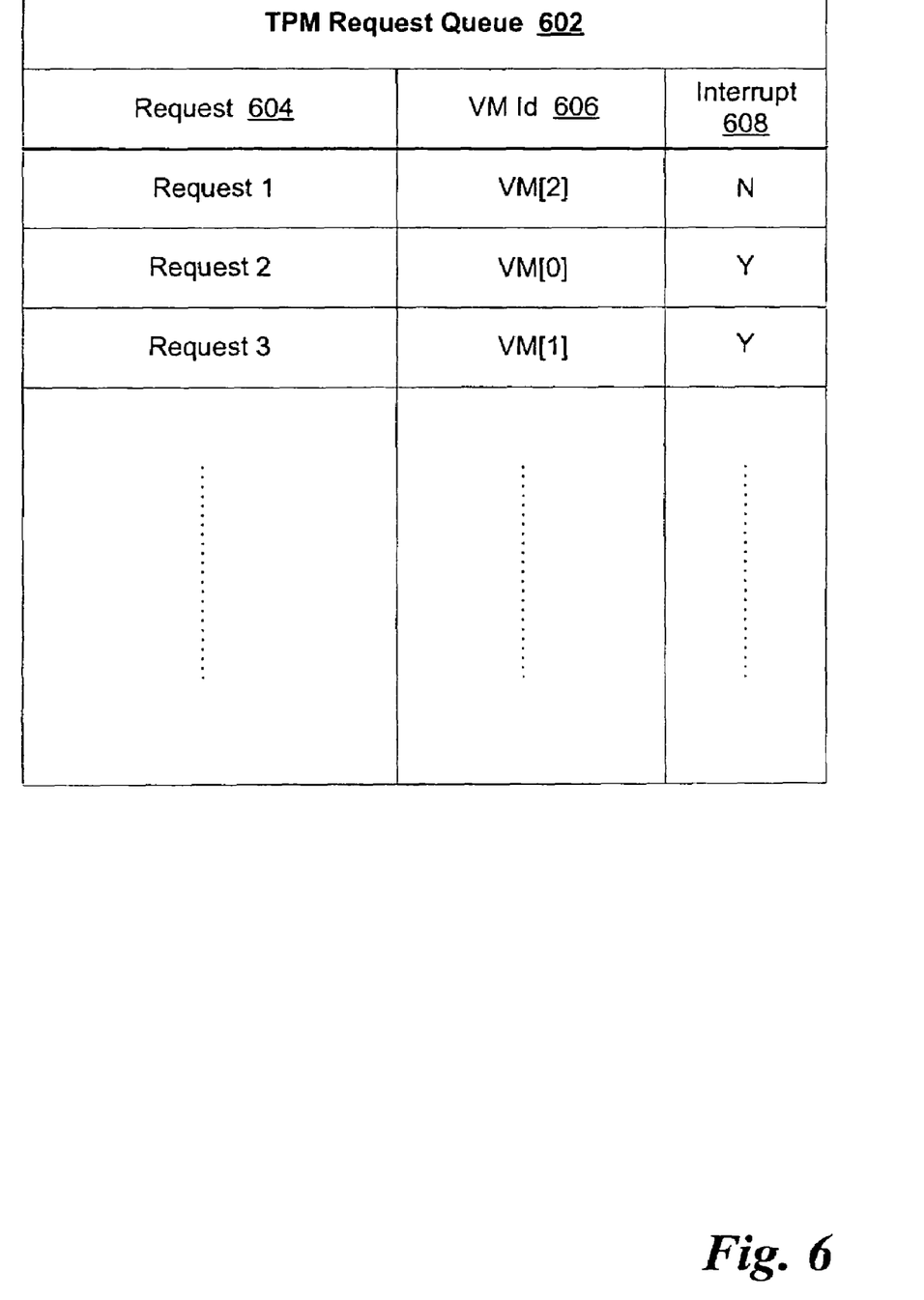
FIG. 6 is a block diagram illustrating one embodiment of a trusted hardware request queue to share trusted hardware across multiple operational environments in accordance with the teachings of the present invention.

Referring to FIG. 6, an embodiment of a TPM request queue 602 is shown. The queue 602 contains three fields: Request 604, VM identification 606, and interrupt 608. The request field 604 contains the TPM request from the VM. VM identification 606 identifies the VM associated with the particular request. The interrupt field 608 includes a Boolean value to indicate if an interrupt should be sent to the VM when the TPM request has been completed. If the interrupt field 608 indicates no, then the VM will know its TPM request has been completed after the VM polls the TPM. If the Interrupt field 608 indicates yes, then the VMM will send an interrupt to the VM indicating the TPM request has been completed. In one embodiment, the TPM command queue 602 is managed as a first-in, first-out (FIFO) queue.

Returning to FIG. 5, if the answer to decision block 506 is no, then the logic proceeds to block 514 (discussed below.) If the answer to decision block 506 is yes, then the logic proceeds to a block 508 to queue the TPM request received from VM[i]. Proceeding to a block 510, the VMM will report that the TPM request is "in progress" if the VM issuing the request polls for the status of the TPM request. In reality, the TPM request may still be residing in the queue waiting for processing. However, since each VM believes it has exclusive access to the physical TPM, the VMM will deceive the polling VM.

Proceeding to decision block 512, the TPM request waits in the queue until the request is next in the queue for processing by the physical TPM. As shown in FIG. 5, the VMM will continue to report "in progress" to any VM requesting the status of its respective queued TPM request.

Once the TPM request is next in the queue, the logic proceeds to a block 514 to commit the TPM request to the physical TPM. Proceeding to a block 516, the queue is updated since the TPM request has started processing. Continuing to block 518, if the VM requested an interrupt, an interrupt is sent to the VM[i] that issued the TPM request to notify the VM[i] that the TPM request has been completed. After block 518, the logic proceeds back to block 502.

Embodiments of the present invention allow multiple operational environments to share trusted hardware. In one embodiment, the multiple VMs are multiplexed to a single physical TPM using a VMM TPM Multiplexer. The Multiplexer provides a thin layer of software support to allow the VMs to share the TPM. In another embodiment, TPM requests from the VMs may be queued into order to manage equitable access to the TPM. In yet another embodiment, the VMM may maintain virtual PCR hash values for each VM. The virtual PCR hash values are translated into a compound hash value that is stored in the corresponding PCR of the physical TPM. The hash values are managed such that security operations are conducted in the physical TPM using the compound hash value.

Figure 7:
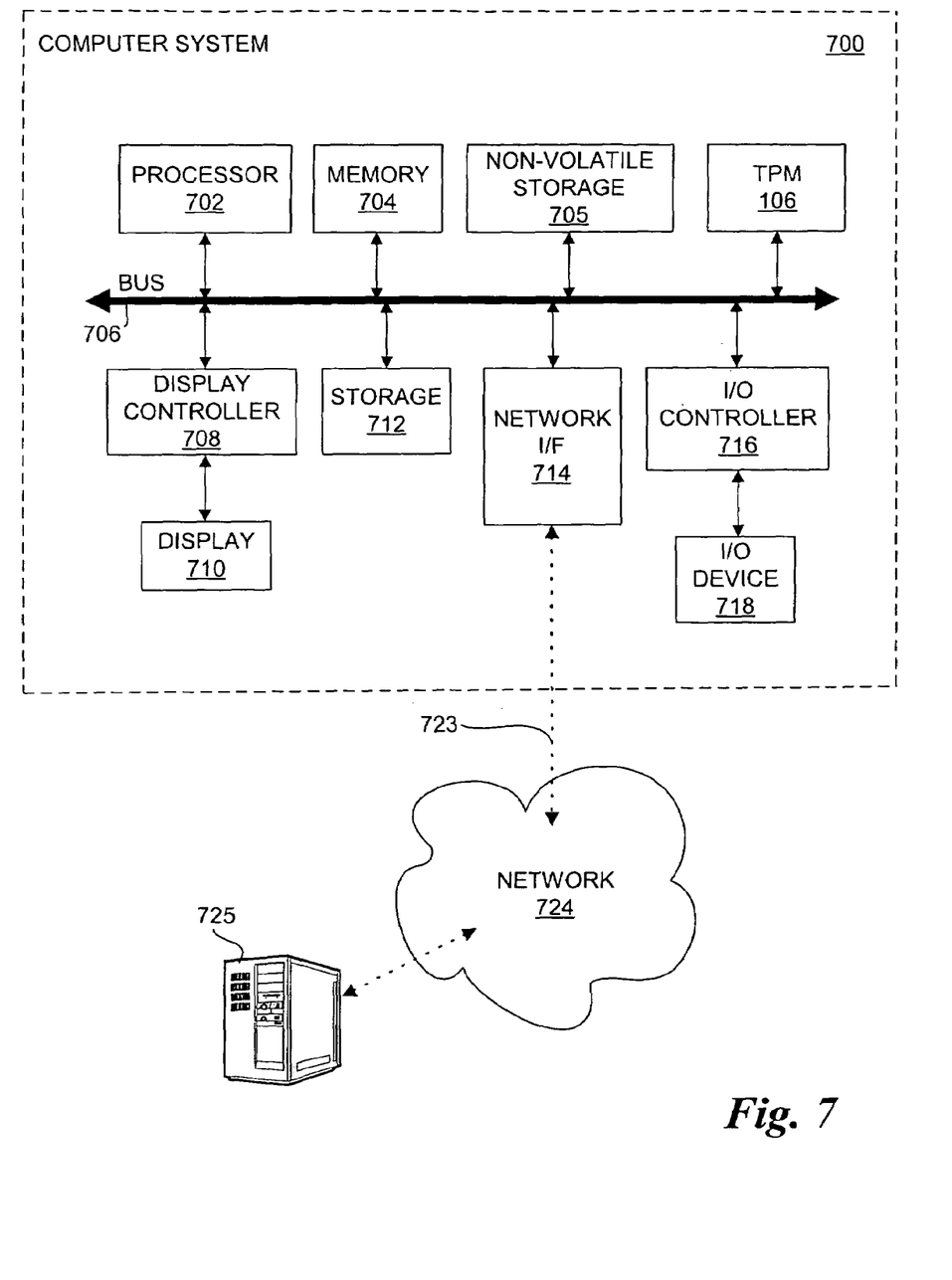
FIG. 7 is a block diagram illustrating one embodiment of an exemplary computer system including a trusted hardware device in accordance with the teachings of the present invention.

FIG. 7 is an illustration of one embodiment of an example computer system 700 on which embodiments of the present invention may be implemented. Computer system 700 includes a processor 702 coupled to a bus 706. TPM 106, memory 704, storage 712, non-volatile storage 705, display controller 708, input/output controller 716 and network interface 714 are also coupled to bus 706. The computer system 700 may interface to external systems through the network interface 714. Network interface 714 may include, but is not limited to, a modem, a network interface card (NIC), a T-1 line interface, a T-3 line interface, a token ring interface, a satellite transmission interface, or other interfaces for coupling a computer system to other computer systems. A carrier wave signal 723 is received/transmitted by network interface 714. In the embodiment illustrated in FIG. 7, carrier wave signal 723 is used to interface computer system 700 with a network 724, such as a local area network (LAN), a wide area network (WAN), or the Internet. In one embodiment, network 724 is further coupled to a remote computer 725 such that computer system 700 and the remote computer 725 may communicate over network 724.

Processor 702 may include, but is not limited to, an Intel Corporation x86, Pentium®, or Itanium® family processor, a Motorola family processor, or the like. In one embodiment, computer system 700 may include multiple processors.

Memory 704 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. Display controller 708 controls in a conventional manner a display 710, which may include a cathode ray tube (CRT), a liquid crystal display (LCD), an active matrix display, or the like. An input/output device 718 coupled to input/output controller 716 may include a keyboard, disk drive, printer, scanner and other input and output devices, including a mouse, trackball, trackpad, joystick, or other pointing device.

The computer system 700 also includes non-volatile storage 705 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), or the like.

Storage 712 includes, but is not limited to, a magnetic hard disk, a magnetic tape, an optical disk, or the like. Some data may be written by a direct memory access process into memory 704 during execution of software in computer system 700. It is appreciated that instructions executable by processor 702 may reside in storage 712, memory 704, non-volatile storage 705 or may be transmitted or received via network interface 714.

For the purposes of the specification, a machine-accessible medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-accessible medium includes, but is not limited to, recordable/non-recordable media (e.g., a read only memory (ROM), a random access memory (RAM), a magnetic disk storage media, an optical storage media, a flash memory device, etc.). In addition, a machine-accessible medium can include propagated signals such as electrical, optical, acoustical or other form of propagated signals (e.g., carrier waves, infrared signals, digital signals, etc.).

It will be appreciated that computer system 700 is one example of many possible computer systems that have different architectures. For example, computer systems that utilize the Microsoft Windows® operating system in combination with Intel processors often have multiple buses, one of which may be considered a peripheral bus. Workstation computers may also be considered as computer systems that may be used with embodiments of the present invention. Workstation computers may not include a hard disk or other mass storage, and executable instructions may be loaded from a corded or wireless network connection into memory 704 for execution by processor 702. In addition, handheld or palmtop computers, which are sometimes referred to as personal digital assistants (PDAs), may also be considered as computer systems that may be used with embodiments of the present invention. A typical computer system will usually include at least a processor 702, memory 704, and a bus 706 coupling memory 704 to processor 702.

It will also be appreciated that in one embodiment, computer system 700 may execute operating system software. For example, one embodiment of the present invention utilizes Microsoft Windows® as the operating system for computer system 700. Other operating systems that may also be used with computer system 700 include, but are not limited to, the Apple Macintosh operating system, the Linux operating system, the Microsoft Windows CE® operating system, the Unix operating system, or the like.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to embodiments of the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method, comprising:
    loading a virtual machine monitor (VMM) to support a plurality of virtual machines in a computer system, the VMM including a VMM multiplexer;
    loading a first and a second virtual machine (VM) supported by the VMM;
    determining a first VM platform configuration including a first hash value based on information measured from the first VM and a second VM platform configuration including a second hash value based on information measured from the second VM;
    using a trusted hardware device shared between the first and the second VM to compute a compound hash value based on a combination of the first VM platform configuration including the first hash value and the second VM platform configuration including the second hash value;
    storing the compound hash value in the trusted hardware device;
    receiving a request for a VMM service that is associated with the first VM, wherein the request comprises a challenger hash value;
    computing a current compound hash value based on a combination of the first VM platform configuration including the challenger hash value and the second VM platform configuration including the second VM hash value;
    determining whether the current compound hash value is equal to the stored compound hash value; and
    executing the received request when the current compound hash value is equal to the stored compound hash value.

2. The method of claim 1 wherein the VMM is loaded from firmware, the firmware including instructions compliant with an Extensible Firmware Interface (EFI) specification.

3. The method of claim 1 wherein sharing the trusted hardware device comprises multiplexing a first request from the first VM and a second request from the second VM to the trusted hardware device using the VMM multiplexer.

4. The method of claim 1, further comprising sealing secret information from the first VM with the compound platform configuration using the trusted hardware device.

5. The method of claim 4, further comprising unsealing the secret information using the trusted hardware device if a current first VM platform configuration matches the first VM platform configuration.

6. The method of claim 1, further comprising maintaining a queue of trusted hardware device requests by the VMM multiplexer, the trusted hardware requests sent to the trusted hardware device from the first VM and the second VM.

7. The method of claim 6, further comprising reporting a first request from the first VM is in progress when the trusted hardware device is polled by the first VM regarding the status of the first request, the first request actually waiting in the queue to be processed by the trusted hardware device.

8. The method of claim 1 wherein the trusted hardware device includes a trusted platform module (TPM).

9. The method of claim 1 wherein sharing the trusted hardware device comprises multiplexing a first request from the first VM and a second request from the second VM to the trusted hardware device using the VMM multiplexer.

10. An article of manufacture comprising:
a storage device including a plurality of instructions which when executed perform operations comprising:
loading a virtual machine monitor (VMM) in a computer system to support a first virtual machine (VM) and a second VM;
loading the first VM and the second VM;
receiving a first VM platform configuration including information measured from the first VM;
computing a first virtual hash based on the first VM platform configuration;
receiving a second VM platform configuration including information measured from the second VM;
computing a second virtual hash value based on the second VM platform configuration;
sending the first virtual hash value and the second virtual hash value to a trusted platform module (TPM) of the computer system, the TPM to compute a compound hash value based on the first virtual hash value and the second virtual hash value;
receiving a request for a VMM service that is associated with the first VM, wherein the request comprises a challenger hash value;
computing a current compound hash value based on a combination of the first VM platform configuration including the challenger hash value and the second VM platform configuration including the second VM hash value;
determining whether the current compound hash value is equal to the stored compound hash value; and
executing the received request when the current compound hash value is equal to the stored compound hash value.

11. The article of manufacture of claim 10 wherein execution of the plurality of instructions further perform operations comprising sending a seal command to the TPM to seal secret information from the first VM with the compound hash value.

12. The article of manufacture of claim 11 wherein execution of the plurality of instructions further perform operations comprising sending an unseal command to the TPM from the first VM to unseal secret information associated with the first VM.

13. The article of manufacture of claim 10 wherein execution of the plurality of instructions further perform operations comprising maintaining a TPM request queue to queue a first TPM request from the first VM and a second TPM request from the second VM.

14. The article of manufacture of claim 13 wherein execution of the plurality of instructions further perform operations comprising reporting the second TPM request is in progress if the TPM is polled by the second VM, the second TPM request actually waiting in the TPM request queue.

15. A computer system, comprising:
a processor;
a trusted hardware device operatively coupled to the processor; and
at least one flash memory device operatively coupled to the processor, the at least one flash memory device including firmware instructions which when executed by the processor perform operations comprising:
loading a virtual machine monitor (VMM) in the computer system to support a first virtual machine (VM) and a second VM, the VMM including a VMM multiplexer;
loading the first VM and the second VM;
maintaining a first VM platform configuration including a first hash number and a second VM platform configuration including a second hash number by the VMM multiplexer; and
storing a compound hash number corresponding to a platform configuration based on a combination of the first VM platform configuration and the second VM platform configuration in the trusted hardware device;
receiving a request for a VMM service that is associated with the first VM, wherein the request comprises a challenger hash value;
computing a current compound hash value based on a combination of the first VM platform configuration including the challenger hash value and the second VM platform configuration including the second VM hash value;
determining whether the current compound hash value is equal to the stored compound hash value; and
executing the received request when the current compound hash value is equal to the stored compound hash value.

16. The computer system of claim 15 wherein execution of the plurality of firmware instructions further perform operations comprising maintaining a queue of trusted hardware device requests by the VMM multiplexer, the trusted hardware device requests sent to the trusted hardware device from the first VM and the second VM.

17. The computer system of claim 15 wherein the firmware instructions compliant with an Extensible Firmware Interface (EFI) specification.

18. The computer system of claim 15 wherein the trusted hardware device comprises a trusted platform module (TPM).

19. A method, comprising:
loading an untrusted virtual machine monitor (VMM) to support a plurality of virtual machines in a computer system, the VMM including a VMM multiplexer;
loading a first and a second virtual machine (VM) supported by the VMM;
sharing a trusted hardware device between the first VM and the second VM using the VMM multiplexer;
receiving a request for a VMM service that is associated with the first VM, wherein the request comprises a challenger hash value;
determining a first VM platform configuration including a first hash value based on information measured from the first VM and a second VM platform configuration including a second hash value based on information measured from the second VM;

using a trusted hardware device shared between the first and the second VM to determine a stored compound hash value based on a combination of the first VM platform configuration and the second VM platform configuration;

computing a current compound hash value based on a combination of the first VM platform configuration including the challenger hash value and the second VM platform configuration including the second VM hash value;

determining whether the current compound hash value is equal to the stored compound hash value; and executing the received request when the current compound hash value is equal to the stored compound hash value.

20. The method of claim 19 wherein the VMM is loaded from firmware, the firmware including instructions compliant with an Extensible Firmware Interface (EFI) specification.

21. The method of claim 19 wherein the compound hash value is stored in the trusted hardware device.

* * * * *